United States Patent [19]

Fay

[11] Patent Number: 5,892,513

[45] Date of Patent: Apr. 6, 1999

[54] INTERMEDIATE NODES FOR CONNECTING VERSIONED SUBTREES IN A DOCUMENT MANAGEMENT SYSTEM

[75] Inventor: Robert G. Fay, San Diego, Calif.

[73] Assignee: Xerox Corporation, Stamford, Conn.

[21] Appl. No.: 660,369

[22] Filed: Jun. 7, 1996

[51] Int. Cl.⁶ .................................................. G06F 7/00
[52] U.S. Cl. ............................................................ 345/357
[58] Field of Search .................................... 345/356, 357, 345/329, 333, 334, 335

[56] References Cited

U.S. PATENT DOCUMENTS 5,379,375 1/1995 Dao et al. ................................. 345/357
5,568,639 10/1996 Wilcox et al. ........................... 345/357

Primary Examiner—Phu K. Nguyen

Attorney, Agent, or Firm—Robert Cunha

[57] ABSTRACT

A system of managing a large number of complex versioned documents. Each document is given a tree structure such as document, chapters, sections and paragraphs. Also, the document is divided into locking units which can be individual nodes, such as one chapter, or subtrees such as one chapter and its three sections. Each locking unit must be checked out by the editing user, at which time it is not available for editing by any other user. Each locking unit contains pointers to the content of its nodes and to a shadow object for each node. The shadow object is allocated in unversioned storage, which does not have to be checked out. The shadow object contains pointers to its corresponding node, to clusters the node belongs to and to the nodes' parent node or nodes. This structure allows a user to reuse parts of a document in another document or include that part in a cluster even when the locking unit containing the part is checked out by another user.

3 Claims, 3 Drawing Sheets

INTERMEDIATE NODES FOR CONNECTING VERSIONED SUBTREES IN A DOCUMENT MANAGEMENT SYSTEM

BACKGROUND OF THE INVENTION

In a document management system, this invention enables updates to the structure of a document tree, and its subtrees, without requiring that the updated subtrees be checked out by the user who is changing the document. This invention consists of an unversioned data field in addition to, and separate from, the versioned portion of the document element data field which can be used for this purpose.

In typical prior document management systems for use in creating and managing large numbers of complex documents, documents are formed into tree structures, where, for example, the root of the tree represents the document, and the next elements below are the chapters, followed by sections, and paragraphs. When a change must be made to an element of a document, it is "checked out" by a user, assuming he has the necessary privileges, and is changed in any way by him. During this time, other users can view this element of the document, but can not modify it. After the user has finished his editing, he checks in the document, whereupon it is again available to other users.

Each element of a document is associated with a data field. For example, one node of a tree may be a chapter, and contain textual data in the form of a chapter heading, a chapter introductory paragraph, a chapter abstract, etc., as well as "structural" data such as the identity of a parent (document), identity of children (sections), and connections to other places in other documents where the same language may also be used. The person who has the document checked out is the only person who can change any of this textual or structural data.

A frequent problem is that several users need to check out the same element. A method of minimizing the probability of two or more users wanting to check out the same document element would be desirable.

SUMMARY OF THE INVENTION

With the use of this invention, the feature of allowing several users to simultaneously change data in one document element is enabled by separating the data into two data fields. In one will be the data that the user who checked out the element must control, such as the text, and structural information such as the links to its children. In the other will be information that is available to anyone for change at any time, provided, of course, that he has the necessary clearance. This would include links specifying parents, additional places in the same or other documents where the same document element would also appear, or other user-specified associations between elements.

More generally stated, the data in a document element can be separated into two data fields. The data that must be controlled by the user who checked out the element is put in one field, or node, that the user has sole control over, and the remaining data is put in an auxiliary, or shadow, node that is available to all other users. In this way, the amount of user waiting can be minimized.

DETAILED DESCRIPTION OF THE INVENTION

Figure 1:
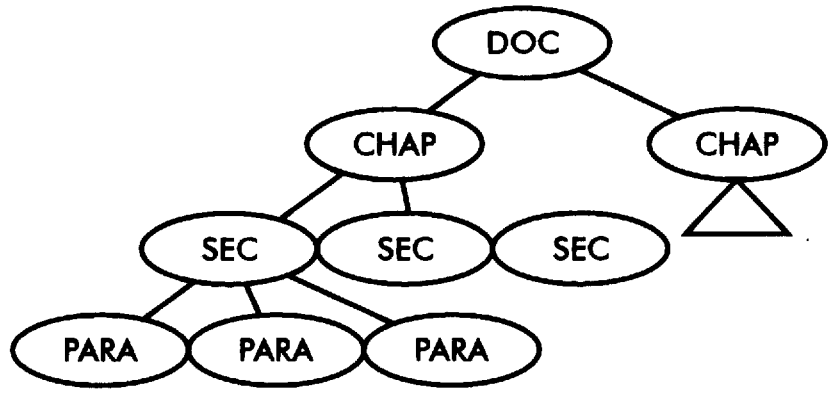
FIG. 1 is a diagram of the basic tree structure.

In this document management system, documents are represented as trees of objects where the nodes of the tree represent the document structure. An entire document may be divided into subtrees. As a numerical example, see FIG. 1 where one document may contain two chapter subtrees, one chapter may contain three sections, and one section may contain three paragraphs.

Each element usually is represented by a number of dated versions, and as the document is updated, the latest version is added to the list of versions for that element, or node. Each element down to the bottom of the tree is known as a subtree. Thus the leftmost section and the three paragraphs of FIG. 1 comprise a subtree.

A "locking unit" is that part of a tree that the user can "check out", and may comprise any tree or subtree or any part thereof. Thus, a locking unit can be any one chapter along with its internal sections and paragraphs, or the chapter and included sections but not the paragraphs, or the chapter node only. Any part of any tree can be specified to be a locking unit. However, it is only one version of a locking unit that is checked out, previous versions are still available to others. Also, any version, locked out or not, is available for viewing by others. The locking unit also contains the links that connect the tree elements within the locking unit, so that if the locking unit contains a section and three paragraphs, the links joining these elements will be within the locking unit, but links of these same paragraphs to other documents will not be within the locking unit. References to document nodes may be fixed or floating. That is, the references may specify a particular version of the node as it exists in a particular version of the locking unit, or float to the latest version.

In addition to locking units in the form of tree nodes, there are other types of data which are stored in non-locking units called shadow, or auxiliary, nodes. Subtrees may be contained in any number of other documents. However, the code of the text will exist in only one place in memory. Any other document that incorporates this text will have only a pointer to the text location. Document elements may also be grouped into "clusters" which are connected by any user-specified relationship. An example of a user-specified relationship is elements containing similar subject matter. Using such a link cluster, when one element is viewed, an indication can be given to the user describing the location of other elements containing similar subject matter.

Figure 2:
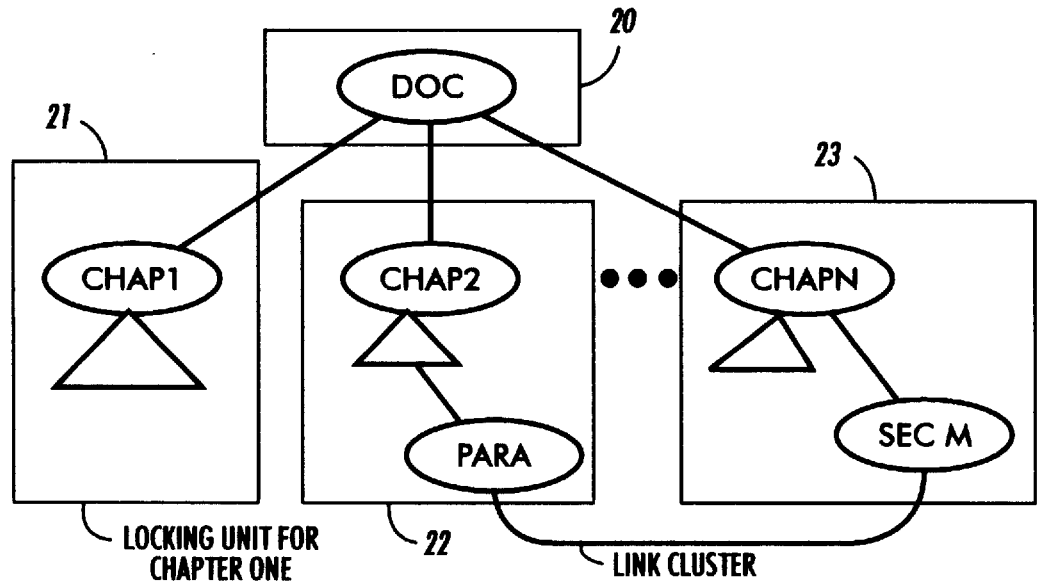
FIG. 2 is a diagram showing examples of various locking units.

FIG. 2 illustrates a set of locking units at the document and chapter level. Four locking units 20–23 are shown. Here it can be seen that locking units can comprise any combination of nodes, such as chapter only, chapter and paragraph or chapter and section. In addition to mother-daughter connections, this figure shows a link cluster connection between a paragraph in chapter 2 and section M.

Privileges similar to the ones used for checking out document elements are also used to modify shadow nodes. In either case the change can not be affected without the appropriate privilege.

This invention comprises an auxiliary, or shadow, node for each node comprising the document structure. This shadow node exists outside the storage for the locking unit, and provides two primary benefits. The first is that structure nodes, in the form of additional cluster links, can be added to associations without locking the containing locking unit. The second is that nodes can be referenced in additional subtrees, thus adding existing document elements to other subtrees outside of the locking unit, without checking out the locking unit containing the material to be added. In this case, the shadow node for the added document element containing the text data is changed to show that the text has been added to an additional node elsewhere, without requiring a user to check out the document having the added material. In other words, a person who has checked out document 2 can add a paragraph to it from document 1, and that fact will be stored in the structure section of document 1, without that person checking out document 1. A shadow node is unversioned, there is only one version, the last, at any one time. The general organization thus becomes a document element comprising text and a structure node having the element name, pointers to the children and a pointer to the shadow node, which in turn contains pointers to the links and parents.

Documents can either be originated within this document management system or can be generated elsewhere and imported. Imported documents are assumed to conform to a Document Type Definition (DTD) specified according to the ISO standard 8879 for document representation known as SGML or Standard Generalized Markup Language. Elements are the logical components of document structure defined in the DTD.

In a document instance, descriptive markup identifies the elements in a document with tags. These tags are interspersed with the textual content of the document. When imported into this document system, the tags and text are separated into various objects. For example, a simple DTD might define a document to consist of chapters, a chapter to consist of sections and a section to be made up of paragraphs. Thus, the imported document instance would contain document, chapter, section, etc., objects having their own attributes and connected according to the structure implied by the descriptive markup.

The use of a part of one document in another document, as stated above, can be floating, where the update of the former is automatically applied to the latter, or not, in which case the use is of a particular dated version, regardless of later modifications. In either case, the existence of the latter documents part will be known to the original.

Figure 3:
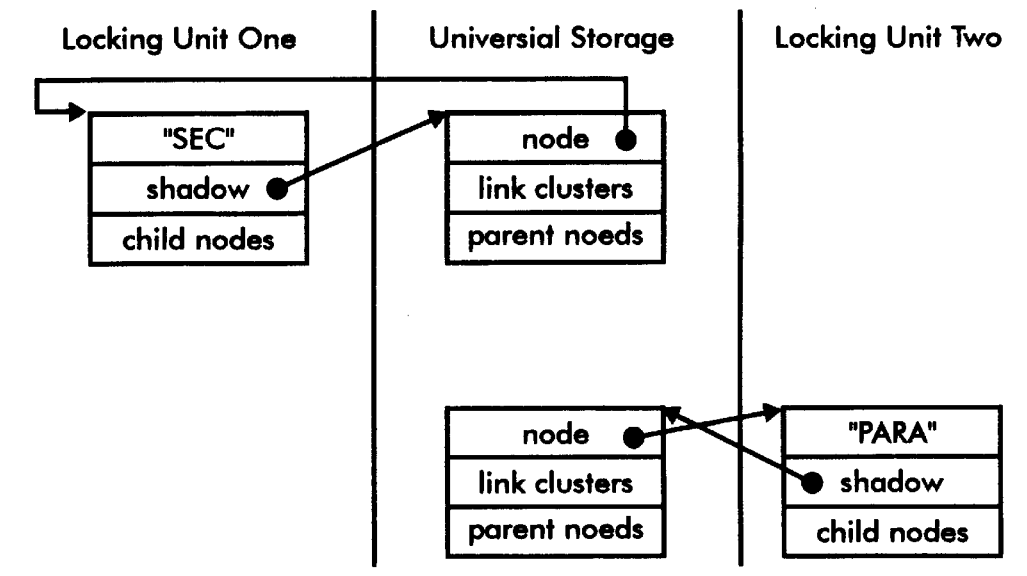
FIG. 3 is a diagram showing how locking units are connected by pointers to individual unversioned storage units called auxiliary, or shadow, nodes.

FIG. 3 is a diagram showing the relationships between two locking units and their shadow nodes. Locking unit one is a section node and contains a pointer to its shadow, unversioned storage, node, and to its child nodes. The associated shadow node contains a pointer to locking unit one, a list of one or more link clusters containing pointers to other locking units, and a list of pointers to one or more parent nodes, depending on how many places the same text is used. Locking unit two has a similar associated shadow node, as shown. This diagram assumes that the two link clusters have no relationship to each other.

Figure 4:
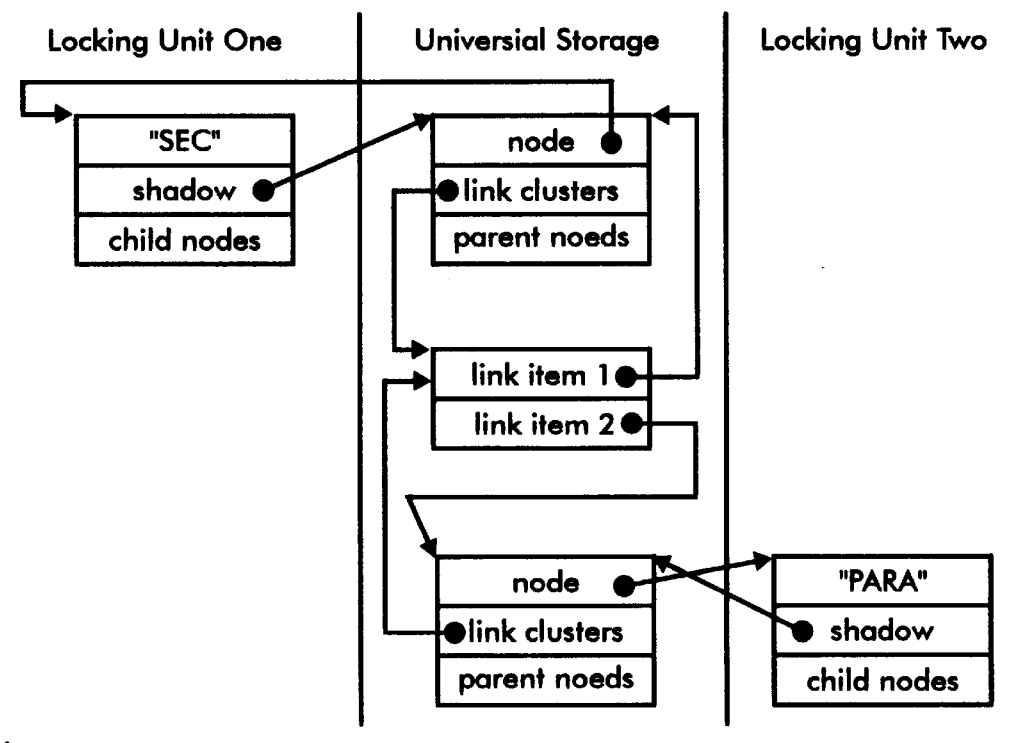
FIG. 4 shows two locking units connected in a link cluster.

FIG. 4 is a diagram of two unrelated nodes that have been joined in a link cluster of the type used to identify to the users that similar information is used in other nodes. In order to join the two in an association, an unversioned link cluster object, here in the form of two link items, is created. Part of a link cluster is the set of pointers to the node items in the cluster. In this case when either locking unit is checked out, a notice is given to the user, through the use of pointers, that similar information is contained in the other locking unit. Note in the diagram that the original section and paragraph nodes are now associated in a link cluster without updating the storage for either locking unit. Furthermore, either node can determine, via its shadow, the link clusters that contain it.

Figure 5:
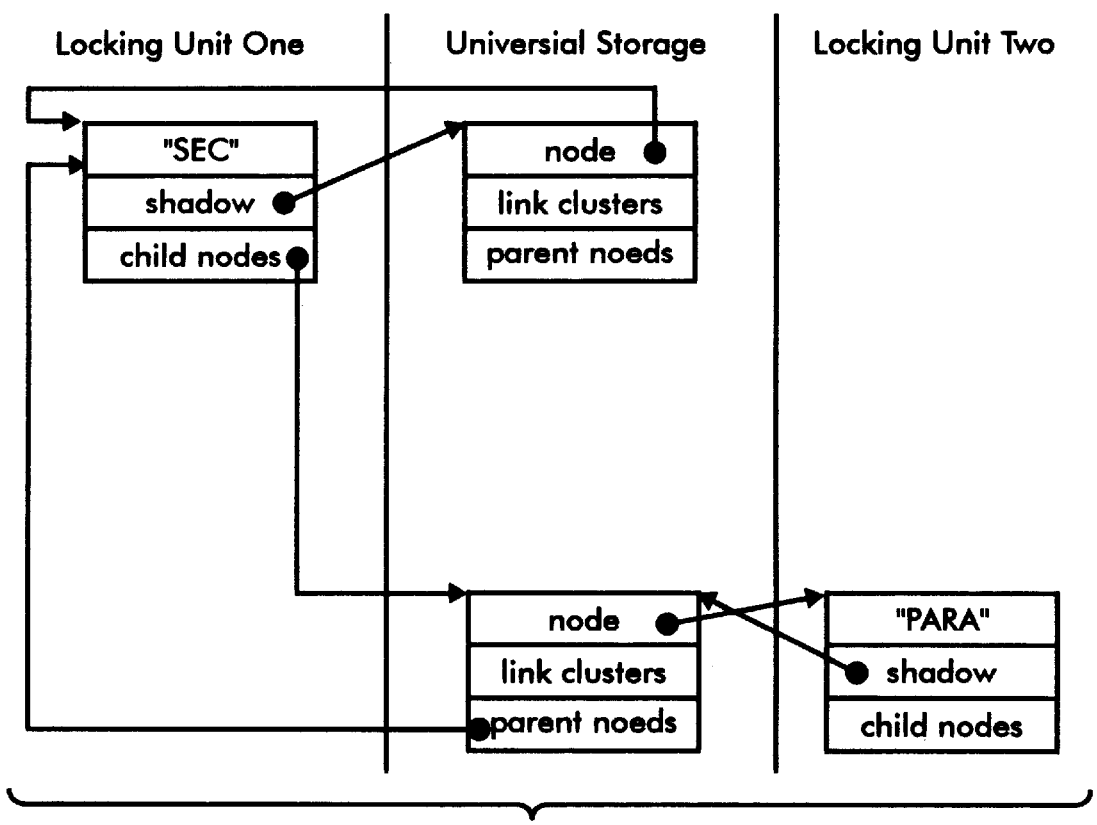
FIG. 5 shows the pointers required to reuse a paragraph in a section.

In a similar fashion, as shown in FIG. 5, an existing subtree may be re-used. Suppose the paragraph node existed previously and an author editing the section wished to reference it. A pointer to the shadow for the paragraph is added to the child list from the section and a pointer back to the section is added to the parent list in the shadow. The paragraph is properly updated as a child of the section and can trace its parents through the shadow. The paragraph need not have been locked to accomplish this.

Simply stated, the user who checked out locking unit one can change his own child node because he has locking unit one checked out, and can change the paragraph parent nodes list because it is in a shadow node which does not have to be checked out. In this way, the user can add the paragraph to his section without checking out the paragraph.

While the invention has been described with reference to a specific embodiment, it will be understood by those skilled in the art that various changes may be made and equivalents may be substituted for elements thereof without departing from the true spirit and scope of the invention In addition, many modifications may be made without departing from the essential teachings of the invention.

I claim:

1. A system of managing documents which are divided into nodes, comprising:
    a locking unit for each node of a document, which may be locked by a user of the system, comprising:
        a) content of text or binary data,
        b) a pointer to said content, and
        c) a pointer to a shadow object allocated in unversioned storage, and unversioned storage for each node comprising a shadow object containing a pointer to the document node and a pointer to the node's parent.

2. The system of claim 1 further comprising a cluster associating two nodes,
    said cluster comprising a pointer to each shadow object of said two nodes, and
    wherein in each shadow of said two nodes there is an additional pointer to the cluster object.

3. A system of managing documents comprising two locking units each having a parent node and a child node, a cluster for associating any two nodes and a shadow object for each node, wherein
    each of said locking units, which may be locked by a user of the system, comprises content and a pointer to said content,
    each of said parent and child nodes comprises a pointer to its shadow object,
    each shadow object comprises a pointer to its node, pointers to said cluster node if the node is one of the two associated nodes, and pointers to the node's parents and
    each cluster has pointers to its associated nodes.

* * * * *